Figure 1:
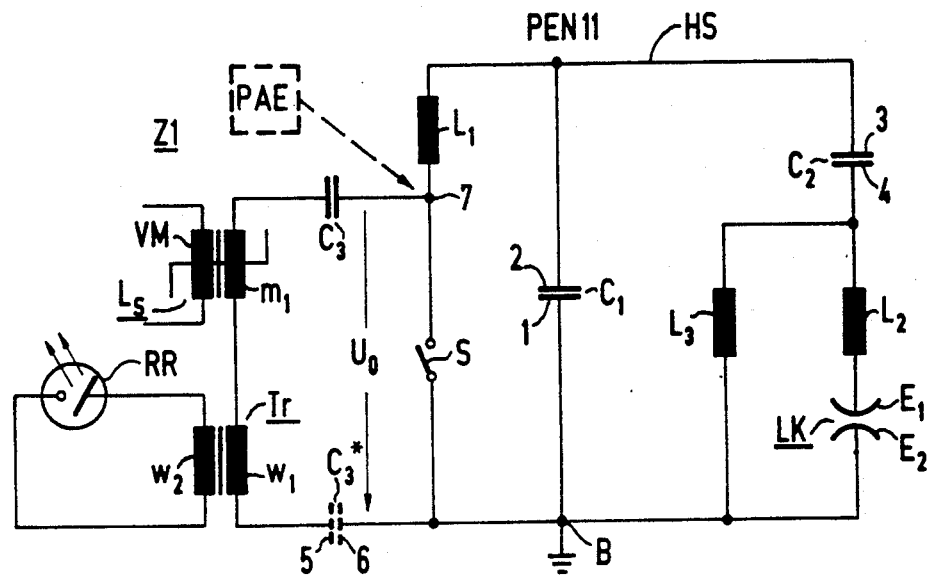

United States Patent [19]
Cirkel et al.

[11] Patent Number: 5,142,547
[45] Date of Patent: Aug. 25, 1992

[54] DEVICE FOR PRE-IONIZATION IN DISCHARGE-PUMPED GAS LASERS, IN PARTICULAR FOR X-RAY PRE-IONIZATION

[75] Inventors: Hans-Jürgen Cirkel, Uttenreuth; Willi Bette, Erlangen, both of Fed. Rep. of Germany

[73] Assignee: Siemens Aktiengesellschaft, Munich, Fed. Rep. of Germany

[21] Appl. No.: 604,973

[22] Filed: Oct. 25, 1990

[30] Foreign Application Priority Data

Apr. 25, 1988 [DE] Fed. Rep. of Germany ....... 3813920

[51] Int. Cl.⁵ ............................................. H01S 3/097
[52] U.S. Cl. ........................................ 372/86; 372/38; 372/25; 372/37; 372/83
[58] Field of Search ............... 372/86, 38, 25, 83, 372/37, 5

[56] References Cited

U.S. PATENT DOCUMENTS

| | | | |
|---|---|---|---|
| 4,592,065 | 6/1986 | de Witte | 372/86 |
| 4,630,277 | 12/1986 | Cirkel et al. | 372/86 |
| 4,698,819 | 10/1987 | Hirth et al. | 372/38 |
| 4,734,841 | 3/1988 | Elliott et al. | 372/86 |
| 4,837,773 | 6/1989 | Wakata et al. | 372/38 |

Primary Examiner—Léon Scott, Jr.
Attorney, Agent, or Firm—Herbert L. Lerner; Laurence A. Greenberg

[57] ABSTRACT

Preionization is important for the generation of a homogeneous glow discharge in the gas space of a laser chamber between laser electrodes. TE type excimer lasers operate especially with X-ray preionization, for which high voltage pulses are needed. According to the present invention, the voltage pulses are obtained by means of an auxiliary circuit that includes a branch which is connected in parallel with a high voltage switch or with the laser discharge gap and which incorporates a saturable magnetic inductance and the primary winding of a high voltage pulse transformer connected in series therewith. The high voltage triggering pulses for the preionization element, which is an X-ray tube in particular, are generated in the secondary winding of the transformer. If the branch is connected in parallel with the high voltage switch it also has a series capacitor. If it is in parallel with the laser discharge gap then the branch has a shunt capacitor. In this way, the timing of the preionization and in particular the X-ray pulse, can be adjusted precisely in relation to the voltage rise time through the laser electrodes and in relation to the laser.

23 Claims, 6 Drawing Sheets

DEVICE FOR PRE-IONIZATION IN DISCHARGE-PUMPED GAS LASERS, IN PARTICULAR FOR X-RAY PRE-IONIZATION

CROSS-REFERENCE TO RELATED APPLICATION

This application is a Continuation of International application Ser. No. PCT/DE89/00242, filed Apr. 20, 1989.

The invention relates to a device for preionization in discharge-pumped gas lasers, in particular for the X-ray preionization of TE lasers, in order to generate a homogeneous glow discharge between the laser electrodes in the gas space of the laser chamber, including a laser excitation having the laser chamber within which at least two of the laser electrodes are mutually spaced apart, opposite each other, extended with their electrode surfaces parallel to the optical axis of the laser chamber and preferably formed with a solid cross-section in that direction; at least one fast-acting high voltage switch being activated or fired for generating high voltage pulses at the laser electrodes through a pulse generating network; the pulse generating network including at least first and second stripline or network capacitors and associated equivalent inductances of the excitation circuit, resulting in particular from the self-inductance of the high voltage switch, the laser chamber, the lines and the stripline or network capacitors, and an auxiliary circuit for generating the preionization high voltage pulses in order to preionize the gas space of the laser chamber, before the high voltage pulse applied to the laser electrodes reaches the firing threshold of the laser glow discharge.

Such a device is essentially known from U.S. Pat. No. 4,630,277.

Large volume, high output lasers of that structural class, using transverse excitation by capacitor discharge, require efficient preionization in order to generate an arc free discharge.

In each instance, the preionization radiation pulse, i.e., in particular of ultraviolet (UV) radiation or the X-ray pulse, must be radiated into the discharge volume through the electrodes of the laser chamber at a defined point in time in the early stage of the voltage rise. The generation of suitable UV radiation through auxiliary electrodes for purposes of preionization is described in German Published, Non-Prosecuted Application DE 30 35 730 A1, corresponding to Canadian Patent No. 1,159,937. Circuit configurations for optimizing the precise time of preionization are set out in U.S. Pat. No. 4,630,277, discussed above.

It is accordingly an object of the invention to provide a device for pre-ionization in discharge-pumped gas lasers, in particular for X-ray pre-ionization, which overcomes the hereinafore-mentioned disadvantages of the heretofore-known methods and devices of this general type and which does so in such a way that the time of the preionization pulse, in particular of an X-ray radiation pulse, in relation to the voltage rise time, can be adjusted precisely by the laser electrodes and matched to the requirements of the special laser.

With the foregoing and other objects in view there is provided, in accordance with the invention, a device for preionization in discharge-pumped gas lasers, comprising a laser excitation circuit including a laser chamber defining a gas space therein and having an optical axis, at least two laser electrodes being mutually spaced apart and opposite each other in the laser chamber defining a laser discharge gap and generating a homogeneous laser glow discharge between the laser electrodes, the laser electrodes having electrode surfaces extended parallel to the optical axis; a pulse generating network having lines connected to the laser electrodes, at least one fast-acting high voltage switch having lines connected to the pulse generating network and being activated or fired for generating high voltage pulses at the laser electrodes; the pulse generating network having at least first and second network capacitors and associated equivalent inductances of the laser excitation circuit at least partly resulting from self-inductance of the high voltage switch, the laser chamber, the lines and the network capacitors, and an auxiliary circuit for generating preionization high voltage pulses for preionizing the gas space of the laser chamber before a high voltage pulse applied to the laser electrodes reaches a firing threshold of the laser glow discharge; the auxiliary circuit having a preionization element, a high voltage pulse transformer with a primary winding and a secondary winding producing the high voltage firing pulse for the preionization element. A branch may be connected in parallel with the high voltage switch. Such a branch has a saturable magnetic inductance as a circuit element connected in series with the primary winding, and a series capacitor. However, instead a branch may be connected in parallel with the laser discharge gap. Such a branch has a saturable magnetic inductance as a circuit element connected in series with the primary winding, and a parallel capacitor.

According to the present invention, saturable inductances are used as circuit elements. Fine adjustments of the time of operation of the preionization pulses, in particular X-ray pulses, is made possible by the degree of premagnetization of these saturable inductances, and further adjustment of the time of operation can be effected by the configuration of the auxiliary circuit with its branch either parallel to the high voltage switch or parallel to the laser discharge gap. The two measures discussed above, namely on one hand the configuration of the branch, and on the other hand the degree of premagnetization, can be used individually or in combination for optimization during the adjustment of the time of operation of the preionization pulse.

As is described in detail in German Patent DE 29 32 781 C2, corresponding to Published European Application No. 0 024 576 A1 and U.S. Pat. No. 4,365,337, the rapid, pulsed capacitor discharge can be effected by a so-called LC inversion circuit (Blümlein circuit) or by a charge transfer circuit. In the same way, the so-called inversion charge transfer circuit (ICT circuit) can also be used, as is described in German Published, Non-Prosecuted Application DE 33 23 614 A1, corresponding to U.S. Pat. No. 4,573,160. In all cases, the voltage rise is initiated through the laser electrodes by firing one or more parallel fast-acting switches such as thyratrons or spark gaps, for example.

The circuits described herein as embodiments of the present invention make it possible to drive the pulse generator for the preionization element, which in particular is an X-ray tube, directly from the pulse generating network for laser excitation, without any additional active circuit element. A saturable inductance is used in the discharge circuit to generate the high voltage pulse. The switching time is determined by the selection of the magnetic flux of the inductance. Fine adjustment can be effected by premagnetization. In the case of large excitation volumes, because of the required penetration depth, preference is given to X-ray preionization in contrast to UV preionization methods. The latter are advantageous in the case of small to medium excitation volumes.

In accordance with another feature of the invention, the laser chamber is a TE laser chamber.

In accordance with a further feature of the invention, the laser electrodes have solid cross-sections extended along the optical axis.

In accordance with an added feature of the invention, the saturable inductance includes a premagnetization winding.

In accordance with an additional feature of the invention, there is provided a DC power source supplying DC for the premagnetization winding, and a low-pass filter connected between the DC power source and the premagnetization winding.

In accordance with yet another feature of the invention, there is provided an LC inversion circuit forming the basis of the pulse generating network.

In accordance with yet a further feature of the invention, there is provided a charge transfer circuit forming the basis of the pulse generating network.

In accordance with yet an added feature of the invention, there is provided a charge capacitor being connected parallel with the laser discharge gap and being combined with the parallel capacitor.

In accordance with yet an additional feature of the invention, the preionization element is an X-ray tube for radiating X-ray radiation pulses into discharge volumes between the laser electrodes.

In accordance with again another feature of the invention, the preionization element includes preionization rods operating according to the principle of corona discharge and generating UV light.

In accordance with a concomitant feature of the invention, the preionization element includes an auxiliary spark discharge gap providing discharge sparks for generating UV light.

Other features which are considered as characteristic for the invention are set forth in the appended claims.

Although the invention is illustrated and described herein as embodied in a device for pre-ionization in discharge-pumped gas lasers, in particular for X-ray pre-ionization, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
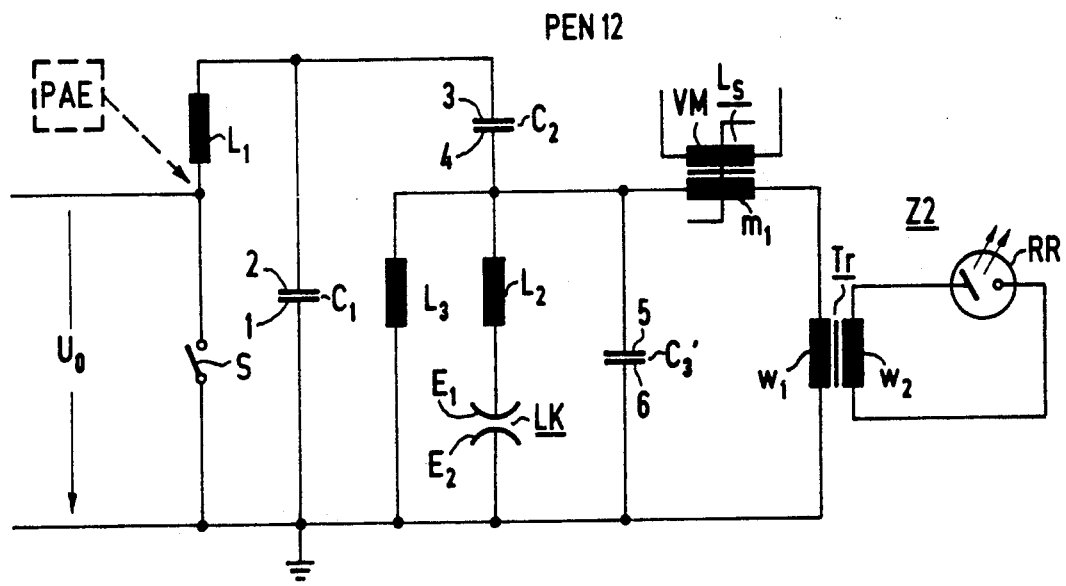
Figure 3:
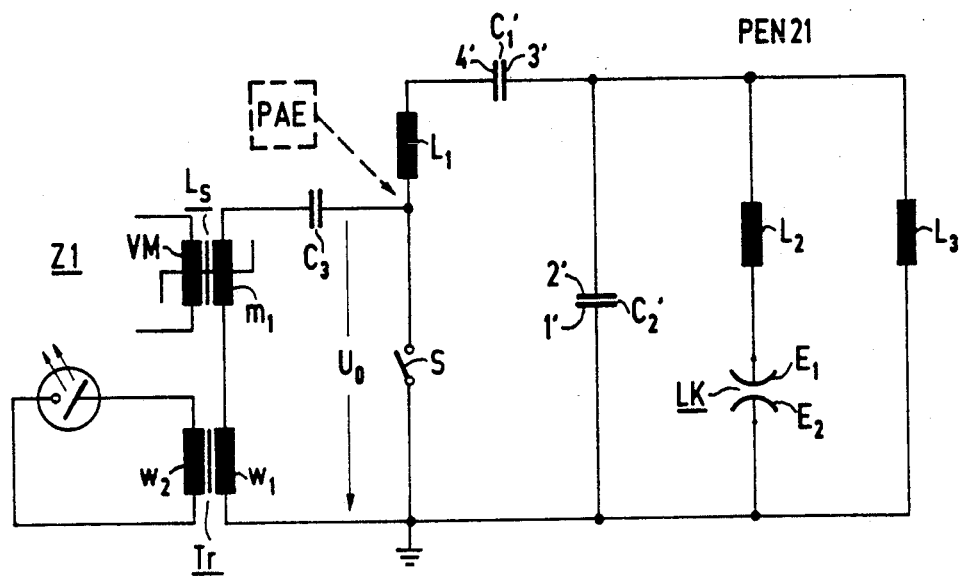
Figure 4:
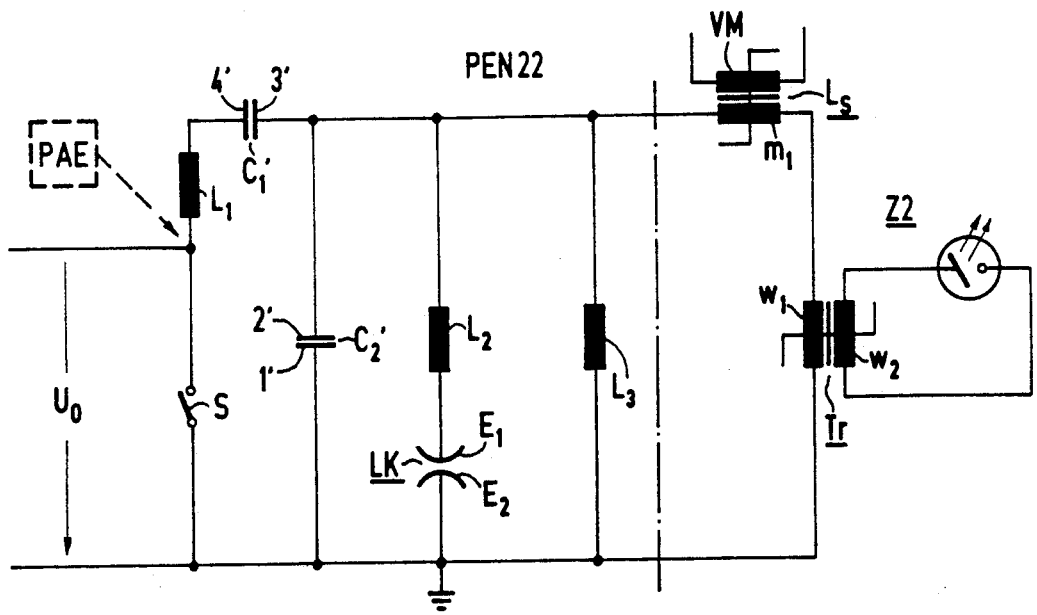
Figure 5:
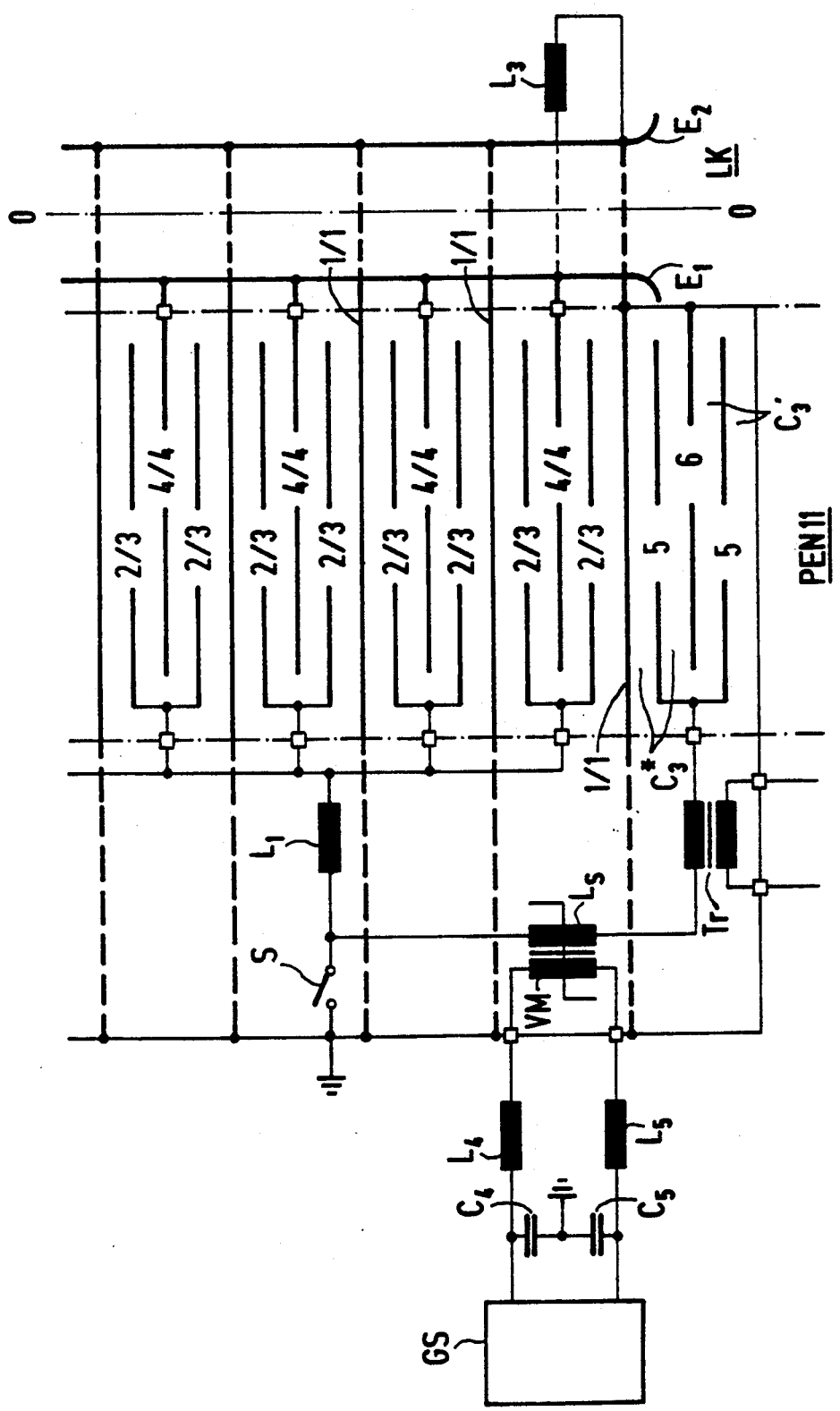
Figure 6:
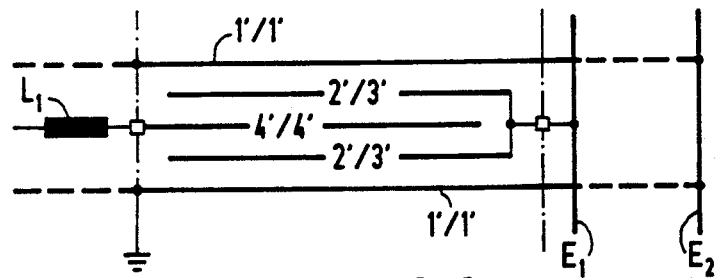
Figure 7:
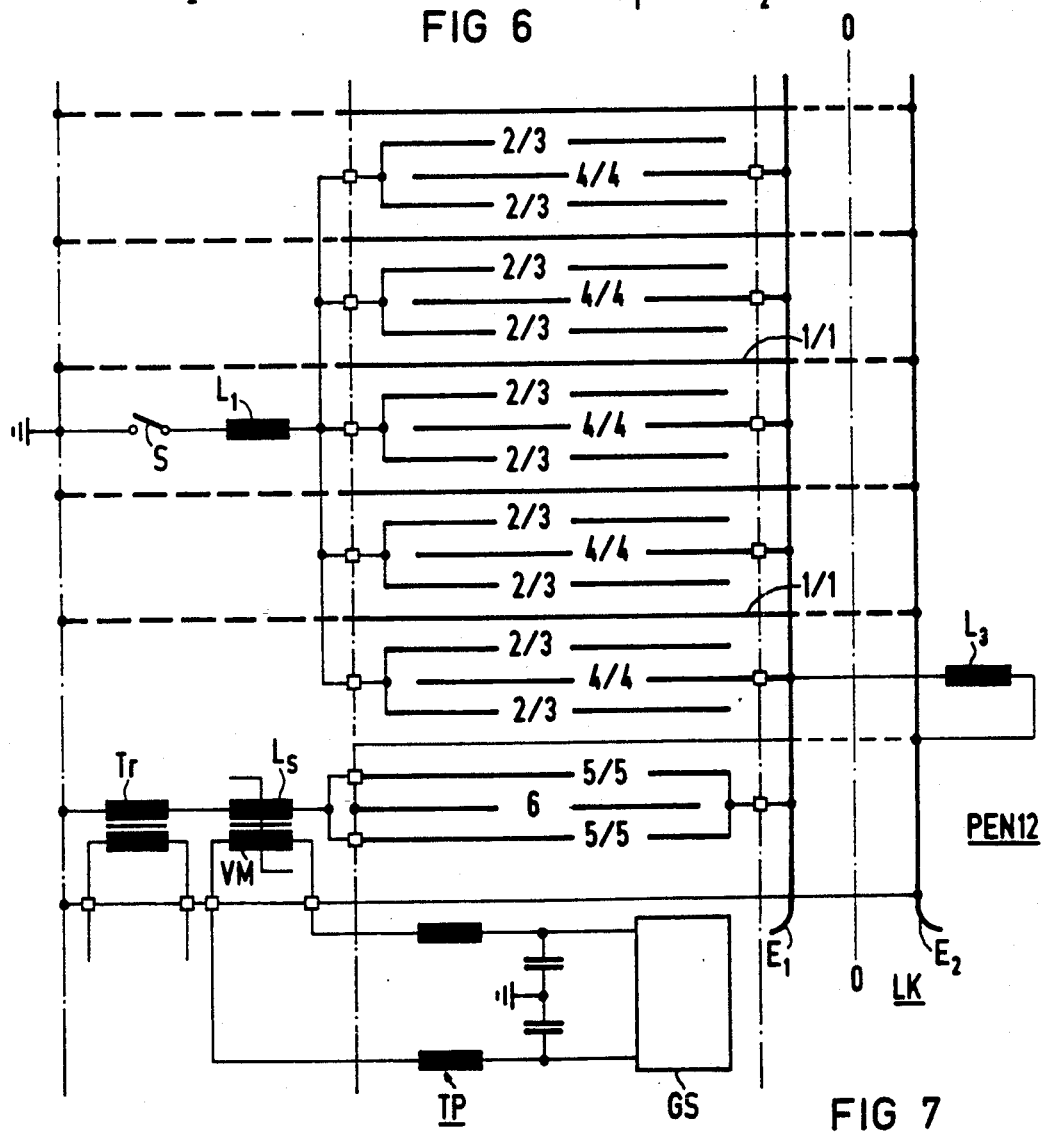
Figure 8:
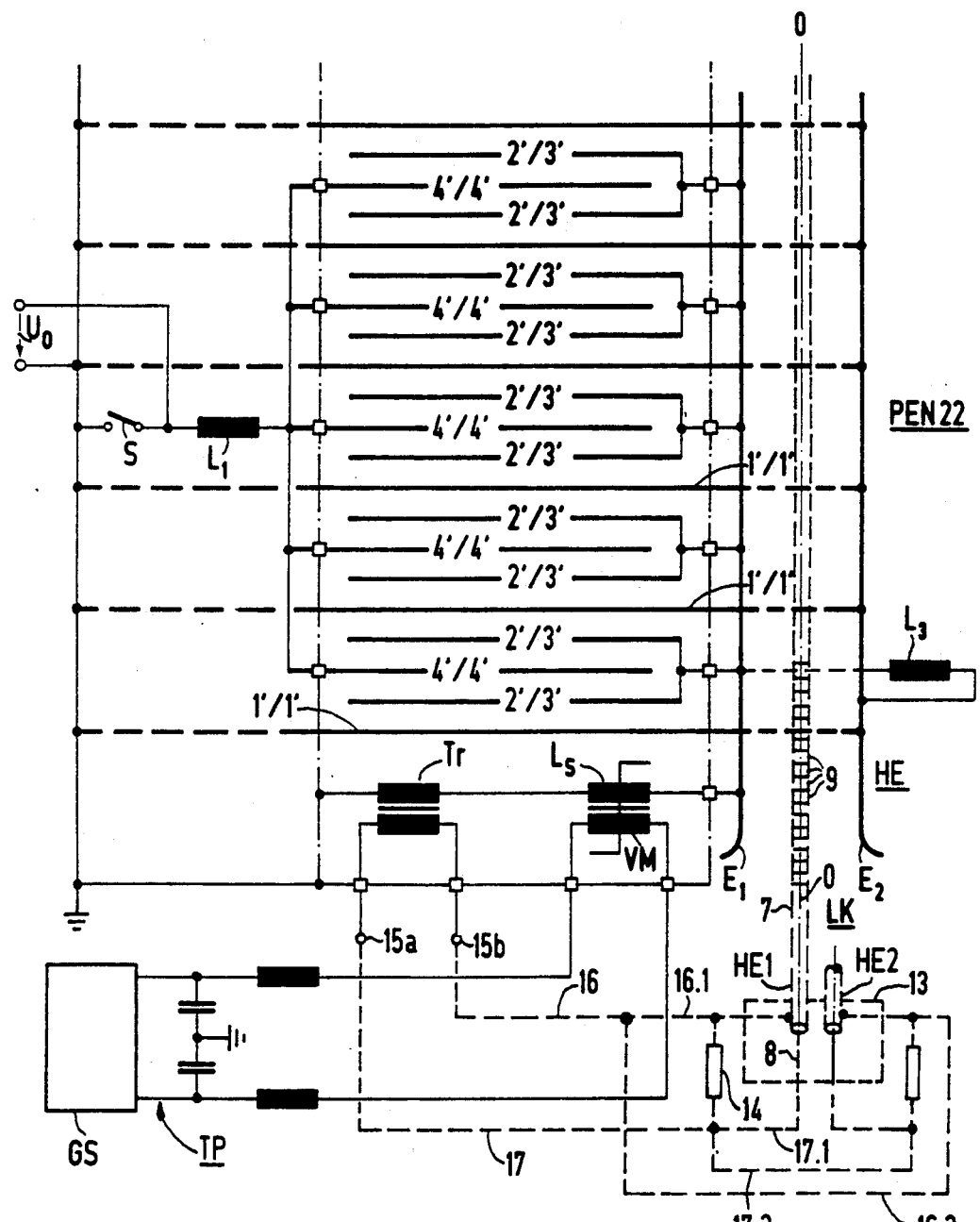
Figure 9:
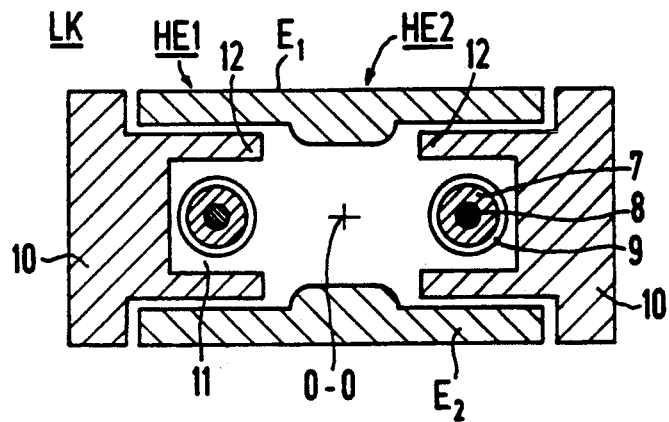
Figure 10:
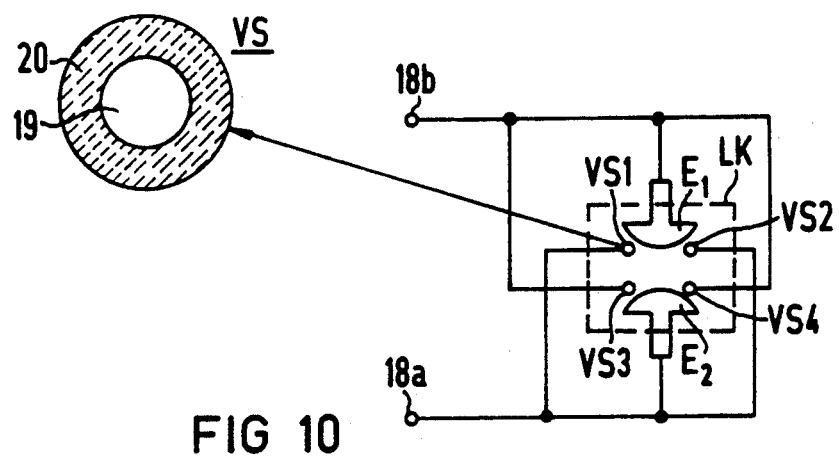

FIG. 1 is a schematic and block circuit diagram of an excitation stage in an LC inversion circuit with a tap of a preionization current path from a high voltage connection of the circuit element FIG. 2 is a diagram of the same circuit as in FIG. 1 with a tap of the preionization current path from the high voltage "jumping" laser electrode FIG. 3 is a circuit diagram of a charge transfer circuit with a tap of the preionization current path from the high voltage connection of the circuit element FIG. 4 is a circuit diagram of a charge-transfer circuit with a tap of the preionization current path from the laser electrode that "jumps" to high voltage FIG. 5 is a circuit diagram and a diagrammatic sectional view showing how the circuit of FIG. 1 is integrated into the laser excitation circuit FIG. 6 is a sectional view showing a modification of the capacitor coating, for a case in which the circuit in FIG. 3 is integrated FIG. 7 is a schematic circuit diagram and a diagrammatic sectional view showing how the circuit in FIG. 2 is integrated into the laser excitation circuit FIG. 8 is another schematic circuit diagram and diagrammatic sectional view showing how the circuit in FIG. 4 is integrated into the laser excitation circuit FIG. 9 is a diagrammatic, sectional view of an auxiliary spark discharge gap as a preionization element FIG. 10 is a schematic circuit diagram and a diagrammatic sectional view showing a device with preionization rods that generate UV light as a preionization element.

Referring now to the figures of the drawing in detail and first, particularly, to FIG. 1 thereof, there is seen a device which is used for X-ray preionization, that includes a pulse generating network PEN 11 in an LC inversion circuit (Blümlein circuit) having an output side which is connected to a laser chamber LK having two laser electrodes $E_1$ and $E_2$, and equivalent inductances $L_2$ in series with a second stripline or network capacitor $C_2$ between the second capacitor $C_2$ and a ground bus B. An impedance $L_3$ lies between a capacitor coating 4 and the ground bus B in parallel with the series circuit of the elements $LK$-$L_2$. The series-parallel circuit described above, including the elements $C_2$-$L_3$-$L_2$-$LK$, is parallel to a first stripline or network capacitor $C_1$, and the first capacitor $C_1$ is parallel to a series circuit made up of a switch inductance $L_1$ and a high voltage switch S. As is indicated schematically by broken lines, high voltage charge pulses are supplied from a pulse charge unit PAE to a circuit point 7 between the elements $L_1$ and S and thus to a high voltage bus HS. The ground connection of the pulse charge unit PAE is not shown. Coatings of the stripline or network capacitors $C_1$, $C_2$ are given reference numerals 1, 2, 3, 4.

An auxiliary circuit for generating preionization high voltage pulses includes a branch Z1 that is connected in parallel with the high voltage switch S, and incorporates a saturable magnetic inductance $L_s$ as a switch element and a primary winding $w_1$ of a high voltage transformer Tr connected in series with the saturable magnetic inductance $L_s$. The high voltage transformer Tr has a secondary winding $w_2$ on which high voltage firing pulses for an X-ray tube RR are generated. The X-ray tube RR is connected to the secondary winding $w_2$ as a preionization element. The inductance $L_s$ has a primary winding $m_1$ and a premagnetizing winding VM. In the illustrated embodiment of the parallel circuit for the high voltage switch, the branch Z1 is provided with a series capacitor $C_3$ that is located between the upper end of the winding $m_1$ and the circuit point 7. Instead, the branch Z1 could also be coupled on the ground side through a series capacitor $C_3^*$ having coatings 5, 6 to the ground bus B and it could be connected galvanically to the circuit point 7. The voltage of the pulse charge unit PAE is given reference symbol $U_0$.

The second embodiment shown in FIG. 2 differs from the first embodiment shown in FIG. 1, in that a branch Z2 of the preionization auxiliary circuit for the laser discharge gap $E_1$-$E_2$ is connected in parallel. The branch Z2 incorporates a parallel capacitor $C_3'$, which one one hand is connected in parallel with the series circuit of the elements $m_1$ and $w_1$ and on the other hand is connected in parallel with the series circuit of the elements $L_2$ and LK. The pulse generating network is given reference symbol PEN 12.

FIGS. 3 and 4, which relate to the third and the fourth embodiments, show a charge transfer circuit for a pulse generating network PEN 21 in FIG. 3 and PEN 22 in FIG. 4. The preionization branch Z1 in FIG. 3 is the same as that in FIG. 1, and similarly the preionization branch Z2 in FIG. 4 corresponds to that of FIG. 2, except for the fact that the parallel capacitor $C_3$ has been combined with the stripline or network capacitor $C_2'$.

If one transforms the circuit shown in FIG. 1 into a spatial diagrammatic configuration as shown in FIG. 5, and in so doing ensures that the condenser coating in FIG. 1 at the capacitor $C_1$ is given reference numerals 1, 2, at the capacitor $C_2$ is given reference numerals 3, 4 and at the capacitor $C_3$ is given reference numerals 5, 6, then one can associate the plates of the individual partial stacks of the so-called water capacitor with the capacitor coatings in FIG. 1. Since the coatings 1 to 4 of the capacitors $C_1$, $C_2$ in FIG. 1 are divided into many partial coatings of a compact water capacitor (that incorporates chemically pure, prepared water as the dielectric) in the form of axially sequenced partial stacks disposed one on top of the other, then in FIG. 5 the partial coatings that correspond to the capacitor coating 1 in FIG. 1, are given reference symbol 1/1, the partial coatings that correspond to the combined coating 2-3 of the capacitors $C_1$ and $C_2$ are given reference symbol 2/3, and the partial coatings that correspond to the capacitor coating 4 in FIG. 1 are given reference symbol 4/4. The spatial diagrammatic configuration that is shown in FIG. 5 applies to a configuration of the capacitor $C_3^*$ in FIG. 1, which is shown by broken lines in FIG. 1, so as to provide a comparison. Naturally, a series capacitor $C_3$ can also be disposed in the upper line, as is shown in FIG. 1. Reference symbol PAE stands for pulse charge unit, as discussed above.

FIG. 5 shows a DC supply GS for premagnetization that is connected to the premagnetization winding VM through a low pass filter including two inductances $L_4$, $L_5$ and two capacitors $C_4$, $C_5$. The remaining reference symbols correspond in FIGS. 5 and 1.

The sectional view of FIG. 6 shows how the capacitor coatings would be disposed were the spatial diagrammatic configuration in FIG. 1 to be based only on a charge transfer circuit as in FIG. 3 instead of the LC inversion circuit as in FIG. 1. Unlike FIG. 1, the individual coatings of the capacitors $C_2'$ and $C_1'$ are numbered 1', 2', 3', and 4' in FIG. 3.

Similarly, the partial coatings shown in FIG. 6 are numbered 1'/1', 2'/3' and 4'/4.

FIG. 7 shows the transformation of the circuit in FIG. 2 into a spatial diagrammatic configuration if an LC inversion circuit of the pulse generating network PEN 12 is used as a basis and the preionization branch Z2 is connected in parallel to the laser chamber LK.

In both spatial diagrammatic configurations shown in FIG. 5 and FIG. 7, a partial stack from the plate stack of the water capacitor in each instance is associated with the preionization branch Z1 of FIG. 1 and Z2 of FIG. 2, and this partial stack is then connected with the pulse transformer Tr and the saturable inductance $L_S$.

FIG. 8 shows the transformation of the circuit shown in FIG. 4 in a spatial diagrammatic configuration, i.e., this involves principally a charge transfer circuit for the pulse generating network PEN 22. As has already been discussed, no separate capacitor $C_3$ or $C_3'$ need be provided therein, because the capacitor $C_2'$ that is connected in parallel to the laser discharge gap is used for the preionization branch Z2. For the remainder of the device, the construction of the configuration in FIG. 8 is easily understood by comparison of FIG. 4 with FIG. 8 in the light of the explanations provided for FIGS. 5 to 7.

In particular, the pulse transformer is configured with a liquid dielectric and floating windings as described in Published European Application No. 0 215 286 B1, corresponding to U.S. Pat. No. 4,763,093 and is accommodated in a common chamber with the switch S.

Similarly, the saturable inductance is also located in this space, through which liquid dielectric flows.

It is preferred that transformer oil be used as the cooling medium and the dielectric for the switch, the transformer, and the saturable inductance. Dielectric liquids and fluorinated hydrocarbons are used for improved heat removal. The dielectric for the stacked capacitor configuration is preferably highly purified water, ethylene glycol, or a mixture of ethylene glycol and water or glycerine.

The capacitor configuration that is assembled with liquid dielectric, including the capacitors $C_1$, $C_2$, and $C_3$, is charged to a voltage $U_0$ within a few microseconds by the pulse charge unit PAE seen FIG. 1 and FIG. 3.

The operation of the LC inversion and the charge transfer circuits is described in great detail in German Patent DE 29 32 781 C2, corresponding to Published European Application No. 0 024 576 A1 and U.S. Pat. No. 4,365,337 and the operation of the ITC circuit is described in similar detail in German Published, Non-Prosecuted Application DE 33 23 614 A1, corresponding to U.S. Pat. No. 4,573,160, so that all that will be dealt with herein is the behavior of the preionization current path. An ICT circuit is an abbreviation used for inversion charge transfer circuit.

No explanation of the preionization circuit in combination with the ICT circuit will be provided herein since the integration is effected exactly as in the charge transfer circuit. By closing the switch S, a voltage surge will be generated by the capacitor $C_3$ the saturable inductance $L_S$, and the pulse transformer Tr in the circuits as in FIG. 1 and FIG. 3. As mentioned above, the winding $m_1$ is the primary-side coil of the inductance $L_S$, VM is the premagnetization winding thereof and the windings $w_1$, $w_2$ are respective primary and secondary windings of the transformer Tr.

The saturable inductance $L_S$ represents a high impedance for the time $\Delta t = (N \cdot A_{Fe} \cdot B_s)/U$, (where N=number of coils, $A_{Fe}$=area of the magnet material and $B_s$=saturation induction), during which it is still in an unsaturated state, so that the total voltage drops in the series circuit formed of $L_S$ and Tr.

The core of the magnet is saturated after passage of the time interval $\Delta t$. The impedance of $L_S$ is reduced very abruptly to an extremely low value. Thus, the capacitor $C_3$ can discharge through the primary winding of the pulse transmitter Tr. The highly transformed pulse is passed to the X-ray tube RR.

The time interval $\Delta t$ depends on the voltage U that is applied, on the saturation induction $B_s$ of the magnet material, on the number of windings N, and on the effective cross section $A_{Fe}$ of the magnet material. A fine adjustment of the delay time $\Delta t$ is achieved in that the saturable inductance incorporates a second winding VM through which the DC flows for premagnetization. The voltage pulse induced in the premagnetization winding VM by "switching through" the core is kept away from the DC power source GS by the low pass filter mentioned above in FIG. 5 or low pass filters TP seen in FIGS. 7 and 8.

FIG. 2 and FIG. 4 show laser excitation circuits in which the preionization network is connected in parallel to the laser chamber LK.

In the case of FIG. 4 (charge transfer circuit) and in the case of the non-illustrated ICT circuit, the incorporation of the capacitor $C_3$ can be eliminated since the capacitor $C_2'$ is already in parallel with the laser chamber. After the switch S has been closed, the voltage begins to rise in both circuits through the laser electrodes. The respective capacitors $C_2'$ or $C_3'$ are charged.

The voltage on the series circuit of the saturable inductance $L_S$ and the primary winding of the pulse transmitter Tr also rises because of this. In this case too, after a time interval $\Delta t$ the magnet core of the saturable inductance is saturated and its impedance changes abruptly from a very high initial value to a very low residual value. The respective capacitor $C_3'$ or $C_2'$ can then discharge into the primary winding of the pulse transmitter.

In the case of the charge transfer circuit of FIG. 4, only a part of the charge of the capacitor $C_2'$ discharges through the pulse transformer. This is dimensioned in such a way that after a pulse duration that is optimal for the preionization, it is similarly saturated and thus the pulse transformation ends. The greater part of the charge of the capacitor $C_2'$ discharges naturally into the laser chamber that breaks through shortly after the occurrence of the preionization pulse.

FIGS. 5 to 8 make it clear how the capacitors $C_3^*$, $C_3$, $C_3'$ or $C_2$ that are required for the preionization circuit are integrated into the laser excitation circuit with a liquid dielectric in the same manner as the capacitors $C_1$ and $C_2$, or $C_1'$, $C_2'$, respectively, having the stack configuration which is described in German Patent DE 29 32 781 C2, corresponding to Published European Application No. 0 024 576 A1 and U.S. Pat. No. 4,365,337. In FIG. 5, one proceeds from the circuit of the capacitor $C_3^*$ (shown by broken lines), which is similar to the circuit of the capacitor $C_3$, which is shown unbroken.

In the case of the use of the device described above for the preionization of the discharge volume of the laser chamber LK by means of UV light, the X-ray tubes are in each instance more expediently replaced by preionization electrodes that can be disposed within the laser chamber LK as is shown in simplified form in FIGS. 8 to 10.

Broken lines in FIG. 8 show the configuration of an auxiliary spark discharge gap HE that has two surface discharge gaps HE1, HE2 as a preionization element. These are installed within the laser discharge volume, parallel to an optical axis 0—0 and at a distance from the surface of the laser electrodes $E_1$, $E_2$ (reference should also be made to the cross-section in FIG. 9, which shows additional details). An internal conductor 8, which may be formed of copper, for instance, is installed in a thin-walled tube 7 of high dielectric strength, such as $Al_2O_3$ ceramic of exceptional purity. A plurality of small tubes or rings 9 formed of a conductive and (in the case of excimer lasers) of a halogen-resistant metal, such as stainless steel or copper, and which are only shown with a partial length in FIG. 8, are slid through the tube 7. These small tubes are bevelled at both ends and configured in such a way that a narrow gap, the spark line, runs between adjacent tubes in a straight line. Two flat laser electrodes $E_1$, $E_2$ formed of corrosion-resistant stainless steel and two housing wings or walls 10 of the laser chamber LK, which are formed of high voltage resistant ceramic, are hermetically connected to each other together with wall surfaces, which cannot be seen in this case. The two surface discharge gaps HE1 and HE2 are each disposed within a niche or recess 11 within the housing between housing projections 12, in such a way that the formation of spark channels to the laser electrodes $E_1$, $E_2$ is prevented.

In FIG. 8, a high voltage bushing or leadthrough for the surface discharge gap is shown at reference numeral 13 in the form of a rectangle, and for the sake of greater clarity a portion of the surface discharge gap HE2 is shown adjacent to the surface discharge gap HE1, even though it is covered. Each of the two electrodes 8, 9 of the surface discharge gaps is bridged by a high resistance impedance 14 and is connected to terminals 15a, 15b of the pulse transformer Tr by means of common connector lines 16, 17, each of which are divided at the two surface discharge gaps HE1, HE2 into respective individual lines 16.1, 17.1 or 16.2, 17.2. The voltage pulses on the secondary side of the pulse transformer Tr do not need to have the height required during operation of the X-ray tube RR, which operates, for example, with voltage pulses of 50 to 100 kV. Voltages of 25 to 30 kV, for example, are sufficient. The turns ratio of the windings $w_1/w_2$ of the pulse transformer is to be matched accordingly. The voltage pulses that are applied to the electrodes 8, 9 in accordance with the repetition rates of the gas laser lead to the formation of intensive flashes of UV light between the individual small tubes or tubules 9 in the spark line, and these preionize the laser gas.

In the embodiment shown in FIG. 10, the preionization elements are formed by preionization rods VS that are numbered VS1 to VS4. They are connected in pairs to a potential or Kelvin terminal 18a (rods VS1, VS2) or to a potential or Kelvin terminal 18b (rods VS3, VS4) and non-illustrated connector lines lead from these potential or Kelvin terminals to the connector terminals 15a, 15b of the pulse transformer Tr.

As is made clear by the enlarged cross-section of the preionization rod indicated generally by reference symbol VS, it is formed of an inner conductor 19 of copper, for example, and a dielectric 20 that surrounds the inner conductor and preferably has a circular cross-section, for which a material such as an exceptionally pure ceramic like $Al_2O_3$, Ba $TiO_3$, or $SrTrO_3$ is used. Like the auxiliary electrodes HE1, HE2 shown in FIG. 8 and FIG. 9, these auxiliary electrodes VS are secured in a similar manner at their ends, so as to face non-illustrated walls of the laser chamber LK, in this case with a flashover distance from the laser electrodes $E_1$, $E_2$ as is shown in principle in FIG. 10. When the pulses are delivered from the pulse transformer Tr (which in this example also need not be as high as in the X-ray preionization and, for example, 25 to 30 kV is sufficient) on the preionization rods VS, there is a flashover between the dielectric 20 of the "auxiliary electrodes" and the adjacent laser electrodes $E_1$, $E_2$, which is to say between the rods VS1, VS2 and the electrode $E_1$, and between the rods VS3, VS4 and the electrode $E_2$, and this is accompanied by a corona discharge. The UV light emitted by the flashes ionizes the laser gas between the laser electrodes.

We claim:

1. A device for preionization in discharge-pumped gas lasers, comprising a laser excitation circuit including:
   A) a laser chamber defining a gas space therein and having an optical axis, at least two laser electrodes being mutually spaced apart and opposite each other in said laser chamber defining a laser discharge gap and generating a homogeneous laser glow discharge between said laser electrodes, said laser electrodes having electrode surfaces extended parallel to the optical axis;
   B) a pulse generating network having lines connected to said laser electrodes, at least one fast-acting high voltage switch having lines connected to said pulse generating network and being activated or fired for generating high voltage pulses at said laser electrodes;
   C) said pulse generating network having at least first and second network capacitors and associated equivalent inductances of said laser excitation circuit at least partly resulting from self-inductance of said high voltage switch, said laser chamber, said lines and said network capacitors, and an auxiliary circuit for generating preionization high voltage pulses for preionizing the gas space of said laser chamber before a high voltage pulse applied to said laser electrodes reaches a firing threshold of the laser glow discharge;
   D) said auxiliary circuit having a preionization element, a high voltage pulse transformer with a primary winding and a secondary winding producing the high voltage firing pulse for the preionization element, and a branch connected in parallel with said high voltage switch, said branch having a saturable magnetic inductance as a circuit element connected in series with said primary winding, and a series capacitor.

2. A device according to claim 1, wherein said laser chamber is a TE laser chamber.

3. A device according to claim 1, wherein said laser electrodes have solid cross-sections extended along the optical axis.

4. A device according to claim 1, wherein the saturable inductance includes a premagnetization winding.

5. A device according to claim 4, including a DC power source supplying DC for said premagnetization winding, and a low-pass filter connected between said DC power source and said premagnetization winding.

6. A device according to claim 1, including an LC inversion circuit forming the basis of said pulse generating network.

7. A device according to claim 1, including a charge transfer circuit forming the basis of said pulse generating network.

8. A device according to claim 1, wherein said preionization element is an X-ray tube for radiating X-ray radiation pulses into discharge volumes between said laser electrodes.

9. A device according to claim 1, wherein said preionization element includes preionization rods operating according to the principle of corona discharge and generating UV light.

10. A device according to claim 1, wherein said preionization element includes an auxiliary spark discharge gap providing discharge sparks for generating UV light.

11. A device according to claim 1, wherein said preionization element includes an auxiliary spark discharge gap providing discharge sparks for generating UV light.

12. A device for preionization in discharge-pumped gas lasers, comprising a laser excitation circuit including:
    A) a laser chamber defining a gas space therein and having an optical axis, at least two laser electrodes being mutually spaced apart and opposite each other in said laser chamber defining a laser discharge gap and generating a homogeneous laser glow discharge between said laser electrodes, said laser electrodes having electrode surfaces extended parallel to the optical axis;
    B) a pulse generating network having lines connected to said laser electrodes, at least one fast-acting high voltage switch having lines connected to said pulse generating network and being activated or fired for generating high voltage pulses at said laser electrodes;
    C) said pulse generating network having at least first and second network capacitors and associated equivalent inductances of said laser excitation circuit at least partly resulting from self-inductance of said high voltage switch, said laser chamber, said lines and said network capacitors, and an auxiliary circuit for generating preionization high voltage pulses for preionizing the gas space of said laser chamber before a high voltage pulse applied to said laser electrodes reaches a firing threshold of the laser glow discharge;
    D) said auxiliary circuit having a preionization element, a high voltage pulse transformer with a primary winding and a secondary winding producing the high voltage firing pulse for the preionization element, and a branch connected in parallel with the laser discharge gap, said branch having a saturable magnetic inductance as a circuit element connected in series with said primary winding, and a parallel capacitor.

13. A device according to claim 12, wherein said laser chamber is a TE laser chamber.

14. A device according to claim 12, wherein said laser electrodes have solid cross-sections extended along the optical axis.

15. A device according to claim 12, wherein the saturable inductance includes a premagnetization winding.

16. A device according to claim 15, including a DC power source supplying DC for said premagnetization winding, and a low-pass filter connected between said DC power source and said premagnetization winding.

17. A device according to claim 12, including an LC inversion circuit forming the basis of said pulse generating network.

18. A device according to claim 12, including a charge transfer circuit forming the basis of said pulse generating network.

19. A device according to claim 18, including a charge capacitor being connected parallel with the laser discharge gap and being combined with said parallel capacitor.

20. A device according to claim 12, wherein said preionization element is an X-ray tube for radiating X-ray radiation pulses into discharge volumes between said laser electrodes.

21. A device according to claim 12, wherein said preionization element includes preionization rods operating according to the principle of corona discharge and generating UV light.

22. A device for preionization in discharge-pumped gas lasers, comprising a laser excitation circuit including:
- A) a laser chamber defining a gas space therein, at least two laser electrodes being mutually spaced apart and opposite each other in said laser chamber defining a laser discharge gap and generating a laser glow discharge between said laser electrodes;
- B) a pulse generating network connected to said laser electrodes, at least one fast-acting high voltage switch connected to said pulse generating network for generating high voltage pulses at said laser electrodes;
- C) said pulse generating network having at least first and second network capacitors and associated equivalent inductances of said laser excitation circuit, and an auxiliary circuit for generating preionization high voltage pulses for preionizing the gas space of said laser chamber;
- D) said auxiliary circuit having a preionization element, a high voltage pulse transformer with a primary winding and a secondary winding producing the high voltage firing pulse for the preionization element, and a branch connected in parallel with said high voltage switch, said branch having a saturable magnetic inductance connected in series with said primary winding, and a series capacitor.

23. A device for preionization in discharge-pumped gas lasers, comprising a laser excitation circuit including:
- A) a laser chamber defining a gas space therein, at least two laser electrodes being mutually spaced apart and opposite each other in said laser chamber defining a laser discharge gap and generating a laser glow discharge between said laser electrodes;
- B) a pulse generating network connected to said laser electrodes, at least one fast-acting high voltage switch connected to said pulse generating network for generating high voltage pulses at said laser electrodes;
- C) said pulse generating network having at least first and second network capacitors and associated equivalent inductances of said laser excitation circuit, and an auxiliary circuit for generating preionization high voltage pulses for preionizing the gas space of said laser chamber;
- D) said auxiliary circuit having a preionization element, a high voltage pulse transformer with a primary winding and a secondary winding producing the high voltage firing pulse for the preionization element, and a branch connected in parallel with the laser discharge gap, said branch having a saturable magnetic inductance connected in series with said primary winding, and a parallel capacitor.

* * * * *